United States Patent
Luerken

[11] Patent Number: 5,837,192
[45] Date of Patent: Nov. 17, 1998

[54] PROCESS AND APPARATUS FOR INERT BLANKETING OF REACTORS

[75] Inventor: Franz Luerken, Kempen, Germany

[73] Assignee: Messer Griesheim GmbH, Germany

[21] Appl. No.: 522,633

[22] Filed: Sep. 1, 1995

[30] Foreign Application Priority Data

Sep. 12, 1994 [DE] Germany ............... 44 32 344.1

[51] Int. Cl.[6] .................................................. A61L 2/00
[52] U.S. Cl. ....................... 422/2; 422/40; 422/111; 422/292
[58] Field of Search ................... 422/2, 40, 34, 422/111, 292

[56] References Cited

U.S. PATENT DOCUMENTS

| | | | |
|---|---|---|---|
| 3,899,099 | 8/1975 | Oiestad | 422/2 |
| 4,213,935 | 7/1980 | Goodnight et al. | 422/182 |
| 4,261,950 | 4/1981 | Bainbridge et al. | 422/26 |
| 4,622,209 | 11/1986 | Nardi et al. | 422/2 |
| 5,353,544 | 10/1994 | Tsutsumi et al. | 422/28 |
| 5,453,245 | 9/1995 | Kirschner et al. | 422/28 |

FOREIGN PATENT DOCUMENTS 3914783  11/1990  Germany.

*Primary Examiner*—Robert J. Warden
*Assistant Examiner*—Krisanne M. Thornton
*Attorney, Agent, or Firm*—Connolly & Hutz

[57] ABSTRACT

When reactors charged with nitrogen as inert-blanketing gas are opened, high losses of inert-blanketing gas occur which previously have only been able to be compensated for by increased feed of inert-blanketing gas. To minimize the consumption of inert-blanketing gas during temporary opening of reactors (1), a further inert-blanketing gas is admixed to the nitrogen. The inert-blanketing gas mixture in the process has a density which is slightly greater than the density of the surrounding air.

14 Claims, 2 Drawing Sheets

PROCESS AND APPARATUS FOR INERT BLANKETING OF REACTORS

BRIEF DESCRIPTION OF THE PRIOR ART

The invention relates to a process for inert blanketing of reactors.

Highly flammable contents of reactors or other vessels must be protected against fire or explosion in particular when the reactors are temporarily open. For this purpose, oxygen entry in such reactors is prevented by inert blanketing. In order to make such inert blanketing as reliable as possible, various measures have already been taken. Thus DE-A 39 14 783 shows an apparatus by which an effective inert blanketing can be achieved in temporarily opened reactors. In the still unpublished German Patent Application P 44 13 074.0-41, a process is presented in which a constant low content of residual oxygen is ensured in an open reactor by the supply of inert gas and the amount of headspace gas taken off in the headspace of the reactor being kept in a constant ratio. Both measures are very highly suitable for preventing explosions in the case of reactors open in the interim which contain products having an explosion hazard.

A general problem in the inert blanketing of such reactors is the losses of inert gas which occur on opening and during charging. The gas loss increases here disproportionately in relation to the diameter of the reactor orifice. Since the user generally desires large open orifices in order to be able to work unhindered at the reactor, undesirable losses of inert gas occur in this case which impair safety and can only be compensated for by relatively high consumptions.

SUMMARY OF THE INVENTION

The object therefore underlying the invention is to create a process and an apparatus by which the inert gas consumption is drastically reduced.

By the novel process and the apparatus it is now possible to ensure an inert blanketing in which even in the case of open reactors, very high safety is produced with minimum inert gas loss. In addition, the costs of inert blanketing are markedly reduced.

For the purposes of the invention, the term reactor is taken to mean all vessels suited for inert blanketing, such as mixers, silos and devices such as shredders and milling units, and all systems to be inert blanketed which are at least temporarily open.

BRIEF DESCRIPTION OF THE DRAWINGS

The drawing depicts an apparatus for carrying out the novel process in diagrammatic form.

In the figures.

DETAILED DESCRIPTION

Figure 1:
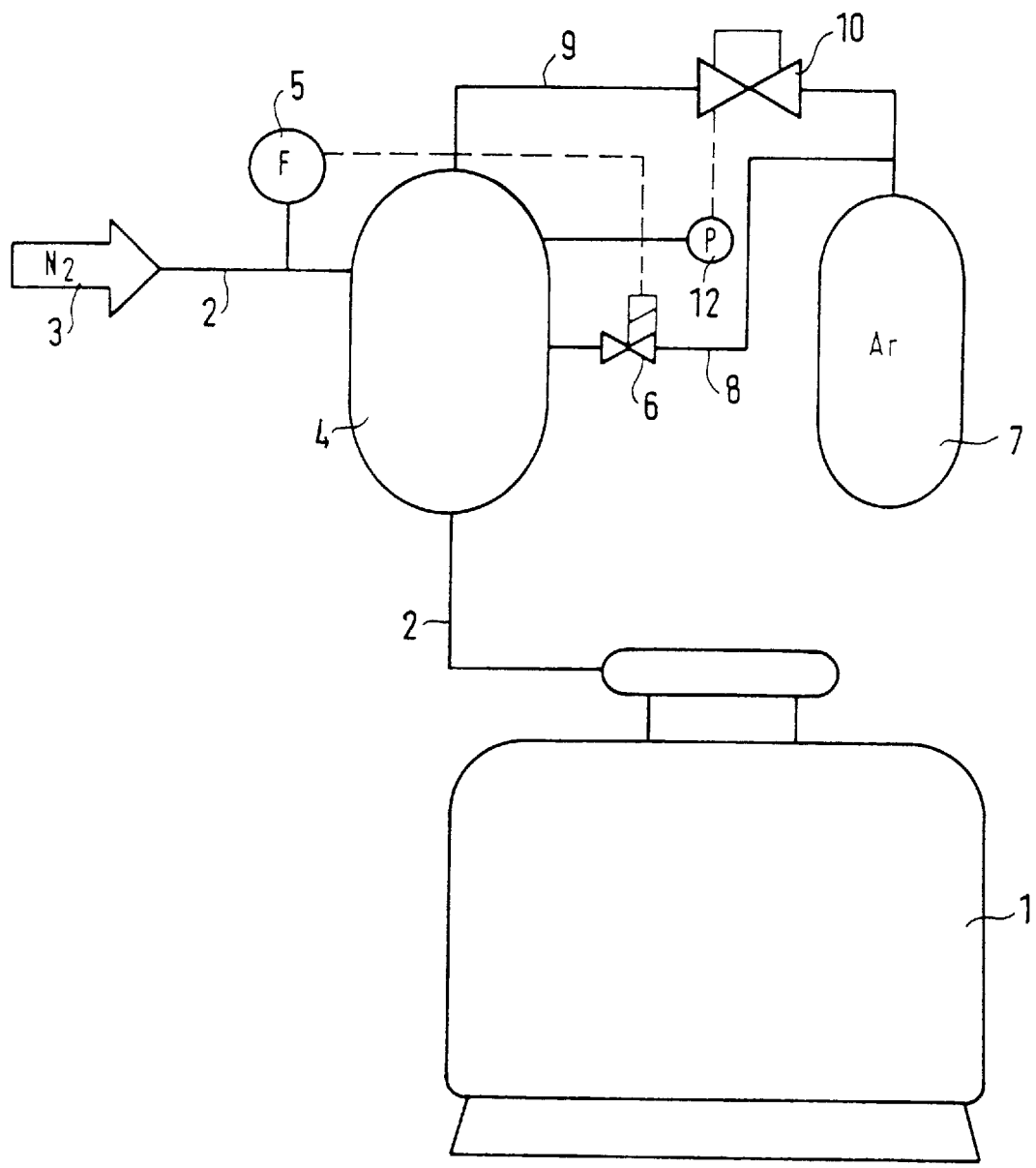
FIG. 1 shows an apparatus suitable for carrying out the process.

In FIG. 1, the reactor 1 to be inert blanketed is connected by a pipe 2 to a supply source 3 for nitrogen as main component via a mixing element 4. In the section of the pipe 2 between the supply source 3 and the mixing element 4 (for mixing the component of source 3 with the component of source 7) is arranged a flow meter 5 which is connected via a control line, to which no reference number is assigned, to a metering apparatus 6 which is triggered by the flow meter and which regulates the feed of a further inert-blanketing gas as an additional component from the supply source 7 via the pipe 8 into the mixing element 4. The mixing element 4 is connected to the supply source 7 for the additional component via a further pipe 9 which has a control apparatus 10 by which a complete supply of the mixing element 4 with the additional component can be ensured. For this purpose, a pressure sensor 12 is provided which is connected to the interior of the mixing element 4 and is connected via a control line to the control apparatus 10. Such a supply, exclusively with the additional component, is provided for emergencies in the event of failure of the main component.

Figure 2:
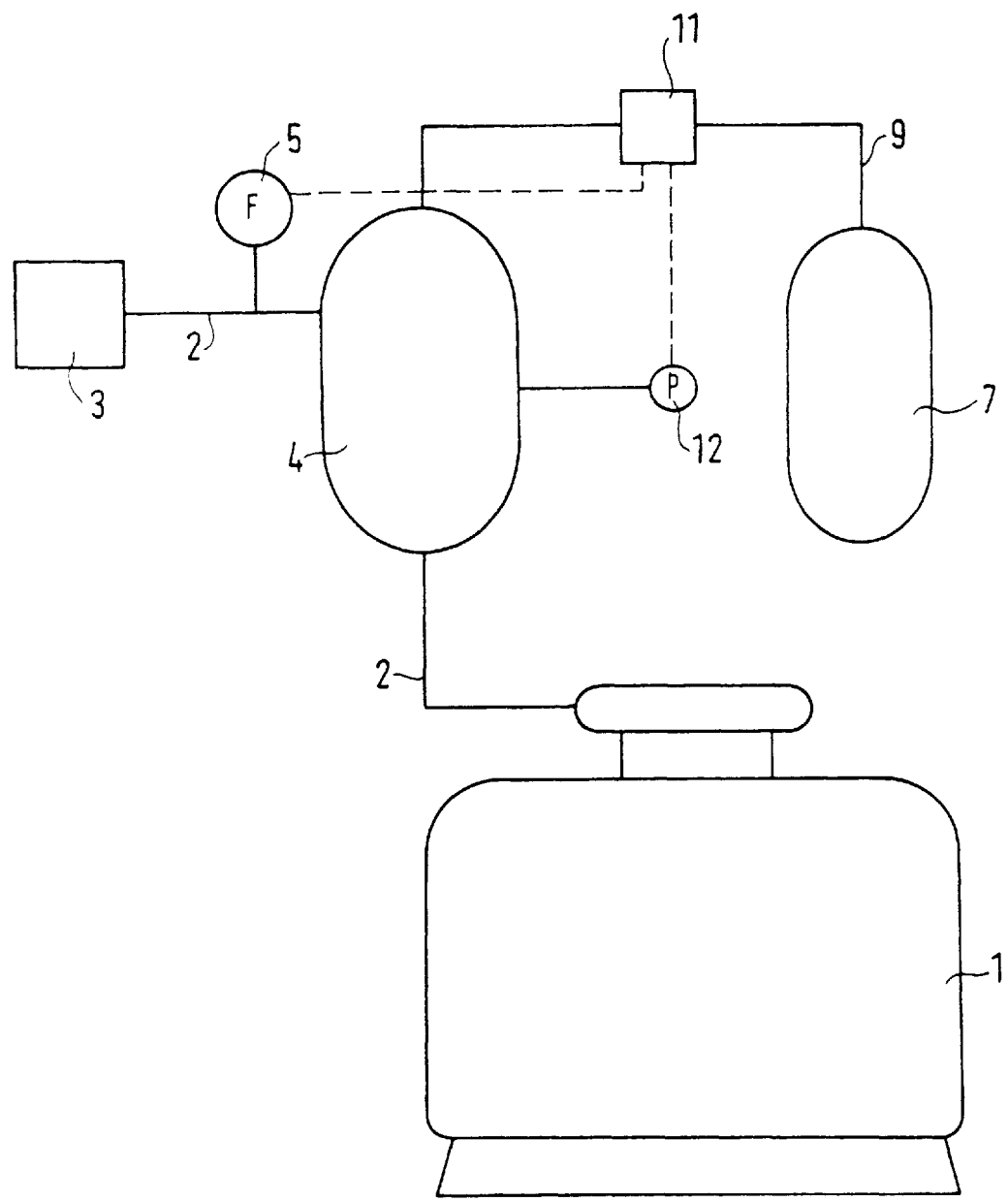
FIG. 2 shows a modification of the apparatus of FIG. 1.

In FIG. 2, in which the same reference numbers are assigned to the same apparatus elements, the control apparatus 10 in the pipe 9 is replaced by a control unit 11, with the elimination of the pipe 8 containing the metering apparatus 6, which control unit 11 takes over in one unit the function of the control apparatus 10 and the metering apparatus 6. It is accordingly triggered by the control line which is connected to the flow meter 5. The control unit 11 likewise possesses a pressure sensor 12.

According to the invention the reactor 1 is now protected against fire or explosion by an inert gas blanketing mixture which has a higher density than the air surrounding the reactor 1. In this case, the invention starts from the assumption that nitrogen which is lighter than air is used for inert blanketing. Nitrogen is inexpensive and can readily be made available. Suitable gases as an additional component to increase the density of the inert gas blanketing mixture are, for example, Ar, $CO_2$, Xe, $SF_6$ and higher noble gases. The additional component is obviously chosen so that it is not a reaction partner under the given conditions. If the reactor 1 which contains readily flammable materials to be processed is opened, even at this point safe inert blanketing is ensured, since the inert-blanketing gas, owing to its density being higher than that of the surrounding air, lies protectively over the readily flammable surface of the product to be inert blanketed. This is ensured by nitrogen being fed to the reactor 1 by a mixing element 4 which, for example, can be constructed as a buffer vessel, to which, to increase the density of the inert-blanketing gas, a second component is added from the supply source 7. The supply source 3 for the nitrogen is preferably an on-site plant, for example a pressure swing absorption (PSA) plant. However, a liquid gas tank can also be used. To increase the density of the inert-blanketing gas, gas is additionally fed into the mixing element 4 from the supply source 7 which contains a second component of higher density than that of the nitrogen, in this case argon. The amount of added argon can be preset, for consumptions of inert-blanketing gas varying little, via a fixed setting of the metering apparatus 6 to the maximum output of the supply source 3. In an apparatus of this type, a plurality of reactors can also be connected, of which not all are in operation simultaneously. When a plurality of reactors are connected, the amount of argon to be supplied must be set in accordance with the peak load.

If the reactors are undersupplied by the supply source 3, the pressure in the mixing element 4 decreases. In the embodiment depicted in FIG. 2, the control circuit which is controlled by the flow meter 5 is then overridden by the pressure sensor 12 and the flow is controlled by the pressure sensor 12. Alternatively, according to FIG. 1, the metering apparatus 6 can control the flow by matching the supply to the through-flow rate of nitrogen by control from signals from the flow meter 5. A liquid argon tank preferably serves as supply source 7. The addition of argon to the nitrogen can be carried out therefrom. In addition, the liquid argon tank is connected via a further pipe 9 to the mixing element 4. In the event that the supply rate from the mixing element 4 through the pipe section which connects the mixing element 4 and the reactor 1 is greater than the supply source 7 can deliver at maximum supply capacity via the metering apparatus 6, further inert blanketing can be ensured by the supply source 7 via the pipe 9 which is constructed for this purpose with a greater pipe cross-section. For this purpose, in the pipe 9, there is arranged a control apparatus 11 which registers a pressure drop in the mixing element 4 due to deficient nitrogen supply and thereupon initiates a greater argon supply from the supply source 7. This device which is provided in case of emergency, further has the advantage that still more favorable conditions are created for the inert blanketing. The component which is considerably more dense in comparison to the inert-blanketing gas mixture rapidly sinks onto the product to be protected and effects, in particular when the reactor is open, a continuing safe protection.

The density of the inert-blanketing gas in the ideal case is to have a value which is above that of the surrounding air and below the density of the atmosphere in the reactor interior, which, for example, because of the saturation of the inert-blanketing gas with solvent vapors can be very high. The choice of the inert gases to be admixed depends to a great extent on the media in the vessel. $CO_2$ is frequently excluded because of the chemical boundary conditions. Ar, on the other hand, is frequently the gas of choice, since it frequently has a lower density than the mixture of solvent vapors, inert gas and residual constituents from the surrounding air. Mixing of inert gas and denser vessel atmosphere is thus prevented so that a clean overlayering proceeds which ensures reliable inert blanketing. The density of the inert-blanketing gas can also be set individually to the density ratios of reactor head contents and surrounding air. Obviously, other suitable inert gases can also be used for density-controlled inert-blanketing. By means of the novel process and the apparatus, in each case a lower inert gas consumption is ensured. This is to be demonstrated with reference to an example as follows:

Table I shows pairs of values for the nitrogen consumption as a result of inert blanketing with pure nitrogen for various orifice diameters of a reactor. It relates, as does the following Table II, to inert blanketing by the process of the as yet unpublished German Patent Application P 44 13 074.041.

TABLE I

| Diameter mm | $N_2$ consumption $m^3/h$ |
|---|---|
| 100 | 1.5 |
| 300 | 11 |
| 450 | 25 |
| 600 | 40 |

Table II shows the values for consumption of nitrogen and argon of the novel process for inert blanketing, in which the same oxygen limit values were maintained as for those in Table I. The composition of an inert-blanketing gas for carrying out the novel process was in this case: nitrogen 90% by volume, argon 8% by volume, residual oxygen 2% by volume.

TABLE II

| Diameter mm | $N_2$ consumption $m^3/h$ | Ar consumption $m^3/h$ | $N_2$ saving $m^3/h$ |
|---|---|---|---|
| 100 | 0.5 | 0.04 | 1 |
| 300 | 3 | 0.24 | 8 |
| 450 | 6 | 0.48 | 19 |
| 600 | 10 | 0.80 | 30 |

Comparable results are achieved with an inert-blanketing gas having the composition nitrogen 92% by volume, $CO_2$ 6% by volume and residual oxygen 2% by volume.

The aims of the invention can generally already be achieved if the density of the inert-blanketing gas mixture fed is only slightly above the density of the surrounding air, preferably less than 2 to 5% above it. The limit of 2% is due to the potential control methods. The upper limit is solely due to economic considerations and can even be higher, e.g. 15%.

As can be seen in the tables, the immediate advantage of the process according to the invention is a markedly reduced consumption of inert-blanketing gas and thus a considerable cost saving. This still applies even when a liquid tank instead of supply by gas cylinders is used for the supply with the second component of higher density. The liquid tank for the second component offers in return the additional reliability of a backup-supply for the severe condition in which supply with the main component fails or a peak load has to be covered. In such a severe condition, the consumption of the denser component is lower in comparison to supply with a conventional light inert-blanketing gas, since according to the invention there is better shielding of the material to be protected against fire due to the higher density of the denser inert-blanketing gas. This leads to further savings. By using an on-site supply for the main component, one tank and its filling at regular intervals are saved, so that overall a cost advantage results.

A further advantage of the process according to the invention is the reduction of gas movement in the headspace of the reactor or the system to be inert-blanketed, resulting in still further decrease in dust discharge. In the individual case, a decrease in the reactor exhaust operation possibly necessary is also achieved, causing smaller amounts of exhaust gas and lower losses of e.g. solvents via the exhaust gas to result.

What is claimed is:

1. A process for the inert blanketing of an at least temporarily open reactor containing flammable substances comprising feeding nitrogen as a main component inert-blanketing gas to a mixing location, feeding at least one additional component as a further inert-blanketing gas to the mixing location, mixing the main component and the at least one additional component in the mixing location to create an inert-blanketing gas mixture having a density above the density of the air surrounding the reactor, and blanketing the interior of the reactor with the inert-blanketing gas mixture.

2. The process of claim 1 wherein the main component inert-blanketing gas and the further inert-blanketing gas are fed to the mixing location from separate sources, and the mixing location is a mixing element between the reactor and the sources.

3. The process as claimed in claim 1, wherein the density of the inert-blanketing gas mixture fed is only slightly above the density of the surrounding air.

4. The process as claimed in claim 3, wherein the additional component is selected from the group consisting of argon and carbon dioxide.

5. The process as claimed in claim 4, wherein the nitrogen is generated at the site of the reactor.

6. The process as claimed in claim 1, wherein the additional component is selected from the group consisting of argon and carbon dioxide.

7. The process as claimed in claim 1, wherein the nitrogen is generated as a gas from liquid nitrogen at the site of the reactor.

8. The process of claim 3 wherein the inert-blanketing gas mixture has a density less than 2 to 5% above the density of the surrounding air.

9. An apparatus for the inert-blanketing of an at least temporarily open reactor comprising a reactor for containing flammable substances, a source of a main component gas, the main component gas being nitrogen, a source of an additional component gas, a mixing element, pipes connecting the mixing element with the main component gas source and with the additional component gas source to create an inert-blanketing gas mixture from the mixture of the nitrogen and the additional component gas, the inert-blanketing gas mixture having a density above the density of the air surrounding the reactor, and a pipe feeding the inert-blanketing gas mixture from the mixing element to the interior of the reactor.

10. The apparatus as claimed in claim 9 including a control apparatus for permitting the supply to the mixing element of only the additional component gas when there is a fall of pressure of the nitrogen being supplied to the mixing element.

11. The apparatus as claimed in claim 10, wherein a flow meter is arranged between the supply source for nitrogen and the mixing element, the flow meter being connected via a control line to a metering device which is arranged in one of the pipes connecting the mixing element to the nitrogen supply source.

12. The apparatus as claimed in claim 9, in which only one pipe is provided connecting the mixing element to the supply source of the additional component gas and a flow meter is present in the pipe, the one pipe having a control unit which on the one hand is connected via a control line to the flow meter as signal transmitter and on the other hand is provided with a pressure sensor connected to the mixing element, the control unit being able to switch over supply solely from the additional component gas supply source in the event of a fall in pressure in the interior of the mixing element.

13. The apparatus as claimed in claim 12, wherein the supply source for nitrogen is a plant at the site of the reactor.

14. The apparatus as claimed in claim 12, wherein the supply source for nitrogen is a liquid tank.

* * * * *